US011508159B2

United States Patent
Hunt

(10) Patent No.: US 11,508,159 B2
(45) Date of Patent: Nov. 22, 2022

(54) OBJECT TRACKING ALGORITHM SELECTION SYSTEM AND METHOD

(71) Applicant: Denso International America, Inc., Southfield, MI (US)

(72) Inventor: Shawn Hunt, Bethel Park, PA (US)

(73) Assignee: Denso International America, Inc., Southfield, MI (US)

( * ) Notice: Subject to any disclaimer, the term of this patent is extended or adjusted under 35 U.S.C. 154(b) by 4 days.

(21) Appl. No.: 17/161,110

(22) Filed: Jan. 28, 2021

(65) Prior Publication Data
US 2022/0237401 A1 Jul. 28, 2022

(51) Int. Cl.
G06V 20/58 (2022.01)
G08G 1/13 (2006.01)
G06K 9/62 (2022.01)
G06V 20/00 (2022.01)

(52) U.S. Cl.
CPC .......... *G06V 20/58* (2022.01); *G06K 9/6227* (2013.01); *G06V 20/39* (2022.01); *G08G 1/13* (2013.01)

(58) Field of Classification Search
CPC ...... G06V 20/58; G06V 20/39; G06K 9/6227; G08G 1/13
See application file for complete search history.

(56) References Cited

U.S. PATENT DOCUMENTS

| 7,526,102 | B2 | 4/2009 | Ozer | |
|---|---|---|---|---|
| 9,501,701 | B2 | 11/2016 | Wood et al. | |
| 2015/0220789 | A1* | 8/2015 | Wood | G06T 7/194 382/103 |
| 2018/0295375 | A1* | 10/2018 | Ratner | G06V 10/26 |

OTHER PUBLICATIONS

Ziegler, J., Bender, P., Schreiber, M., Lategahn, H., Strauss, T., Stiller, C., Dang, T., Franke, U., Appenrodt, N., Keller, C.G. and Kaus, E., 2014. Making bertha drive—an autonomous journey on a historic route. IEEE Intelligent transportation systems magazine, 6(2), pp. 8-20.*

(Continued)

*Primary Examiner* — Zhitong Chen
(74) *Attorney, Agent, or Firm* — Christopher G. Darrow; Darrow Mustafa PC

(57) ABSTRACT

A system for utilizing object tracking algorithms for tracking objects external to a vehicle includes a processor and a memory in communication with the processor. The object tracking algorithms include a lower computationally demanding object tracking algorithm and a higher computationally demanding object tracking algorithm. The memory has one or more modules that have instructions that cause the processor to determine if the vehicle is located in an urban setting or a non-urban setting and utilize the lower computationally demanding object tracking algorithm by an object tracking system when the vehicle is located in the non-urban setting. If it is determined that the vehicle is in an urban setting, the instructions cause the processor to determine available computational resources of the object tracking system and utilizing either the lower computationally demanding object tracking algorithm or the higher computationally demanding object tracking algorithm based on the available computational resources.

13 Claims, 5 Drawing Sheets

(56) References Cited

OTHER PUBLICATIONS

Gies, F., Danzer, A. and Dietmayer, K., Nov. 2018, Environment perception framework fusing multi-object tracking, dynamic occupancy grid maps and digital maps. In 2018 21st International Conference on Intelligent Transportation Systems (ITSC) (pp. 3859-3865). IEEE.*

Li, X., Wang, K., Wang, W. and Li, Y., Jun. 2010, A multiple object tracking method using Kalman filter. In The 2010 IEEE international conference on information and automation (pp. 1862-1866). IEEE (Li).*

Hu et al., "Adaptive Kalman Filtering for Vehicle Navagation," Journal of Global Positional System, vol. 2, No. 1: 42-47, 6 pages (2003).

Wang et al., "Combination of Interacting Multiple Models with the Particle Filter for Three-Dimensional Target Tracking in Underwater Wireless Sensor Networks," Hindawi Publishing Corporation, Mathematical Problems in Engineering, vol. 2012, Article ID 829451, 17 pages.

* cited by examiner

OBJECT TRACKING ALGORITHM SELECTION SYSTEM AND METHOD

TECHNICAL FIELD

The subject matter described herein relates, in general, to systems and methods for utilizing different object tracking algorithms for tracking objects external to a vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with one or more sensors for detecting objects located in the environment in which the vehicle operates. Information from these sensors can be provided to one or more vehicle systems or subsystems. For example, these vehicle systems and subsystems may include object location and object tracking systems. Object location systems can receive sensor information from one or more sensors and identify objects located within the sensor information.

Object tracking systems take this one step further. Moreover, object tracking systems track the movement of the objects identified by the object location systems. Generally, the tracking of the objects includes both determining the actual position of the object from one or more sensors but also include other computationally intensive features, such as predicting where objects may be moving in the future or determining where previously detected objects may be presently located when they become occluded or otherwise cannot be detected by one or more sensors of the vehicle.

SUMMARY

This section generally summarizes the disclosure and is not a comprehensive explanation of its full scope or all its features.

In one example, a system for utilizing object tracking algorithms for tracking objects external to a vehicle includes a processor and a memory in communication with the processor. The object tracking algorithms include a lower computationally demanding object tracking algorithm and a higher computationally demanding object tracking algorithm. The memory has one or more modules that have instructions that cause the processor to determine if the vehicle is located in an urban setting or a non-urban setting and utilize the lower computationally demanding object tracking algorithm by an object tracking system when the vehicle is located in the non-urban setting. If it is determined that the vehicle is in an urban setting, the instructions cause the processor to determine available computational resources of the object tracking system and utilizing either the lower computationally demanding object tracking algorithm or the higher computationally demanding object tracking algorithm based on the available computational resources.

In another example, a method for utilizing a plurality of object tracking algorithms for tracking objects external to a vehicle includes the steps of determining if the vehicle is located in an urban setting or a non-urban setting and utilizing a lower computationally demanding object tracking algorithm by an object tracking system when the vehicle is located in the non-urban setting. In addition, the method may include the steps of determining available computational resources of the object tracking system and utilizing the lower computationally demanding object tracking algorithm by the object tracking system when the available computational resources are not sufficient to execute the higher computationally demanding object tracking algorithm and utilizing a higher computationally demanding object tracking algorithm by the object tracking system when the available computational resources are sufficient to execute the higher computationally demanding object tracking algorithm and the vehicle is located in the urban setting.

In yet another example, a non-transitory computer-readable medium may store instructions that, when executed by a processor, causes the processor to determine if the vehicle is located in an urban setting or a non-urban setting and utilize a lower computationally demanding object tracking algorithm by an object tracking system when the vehicle is located in the non-urban setting. In addition, the non-transitory computer-readable medium may store instructions that, when executed by a processor, cause the processor to determine available computational resources of the object tracking system and utilizing the lower computationally demanding object tracking algorithm by the object tracking system when the available computational resources are not sufficient to execute the higher computationally demanding object tracking algorithm and utilize a higher computationally demanding object tracking algorithm by the object tracking system when the available computational resources are sufficient to execute the higher computationally demanding object tracking algorithm and the vehicle is located in the urban setting.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are a system and related method for selecting an appropriate object tracking algorithm for use by an object tracking system of a vehicle. Algorithms utilized by object tracking systems can vary significantly in performance as well as computational complexity. Moreover, lower computationally demanding object tracking algorithms generally have the advantages in that they require fewer computational resources but have the disadvantage in that they are less robust in tracking objects. Higher computationally demanding object tracking algorithms have the advantages of being more robust in tracking objects but require significantly more computational resources.

The system and method for selecting an appropriate object tracking algorithm consider the environment in which the vehicle is operating in to determine what type of object tracking algorithm should be utilized. For example, if the system and method determine that the vehicle is operating in a non-urban setting, the system and method may select a less computationally demanding object tracking algorithm. The reasoning is that there will be fewer objects to track and, generally, these objects will include vehicles, as opposed to more fragile objects, such as non-motorized vehicles and pedestrians.

Conversely, if it is determined that the vehicle is operating in an urban setting, the system and method may select a higher computational demanding object tracking algorithm. The reason being that when the vehicle is located in an urban setting, a priority should be placed on the tracking of objects, especially more fragile objects such as non-motorized vehicles and pedestrians. If it is determined that the vehicle is operating in an urban setting, the system and method may determine the amount of computational resources available. Based on this determination, the system and method will utilize this information to select an appropriate object tracking algorithm that can be satisfied by the available computational resources.

Figure 1:
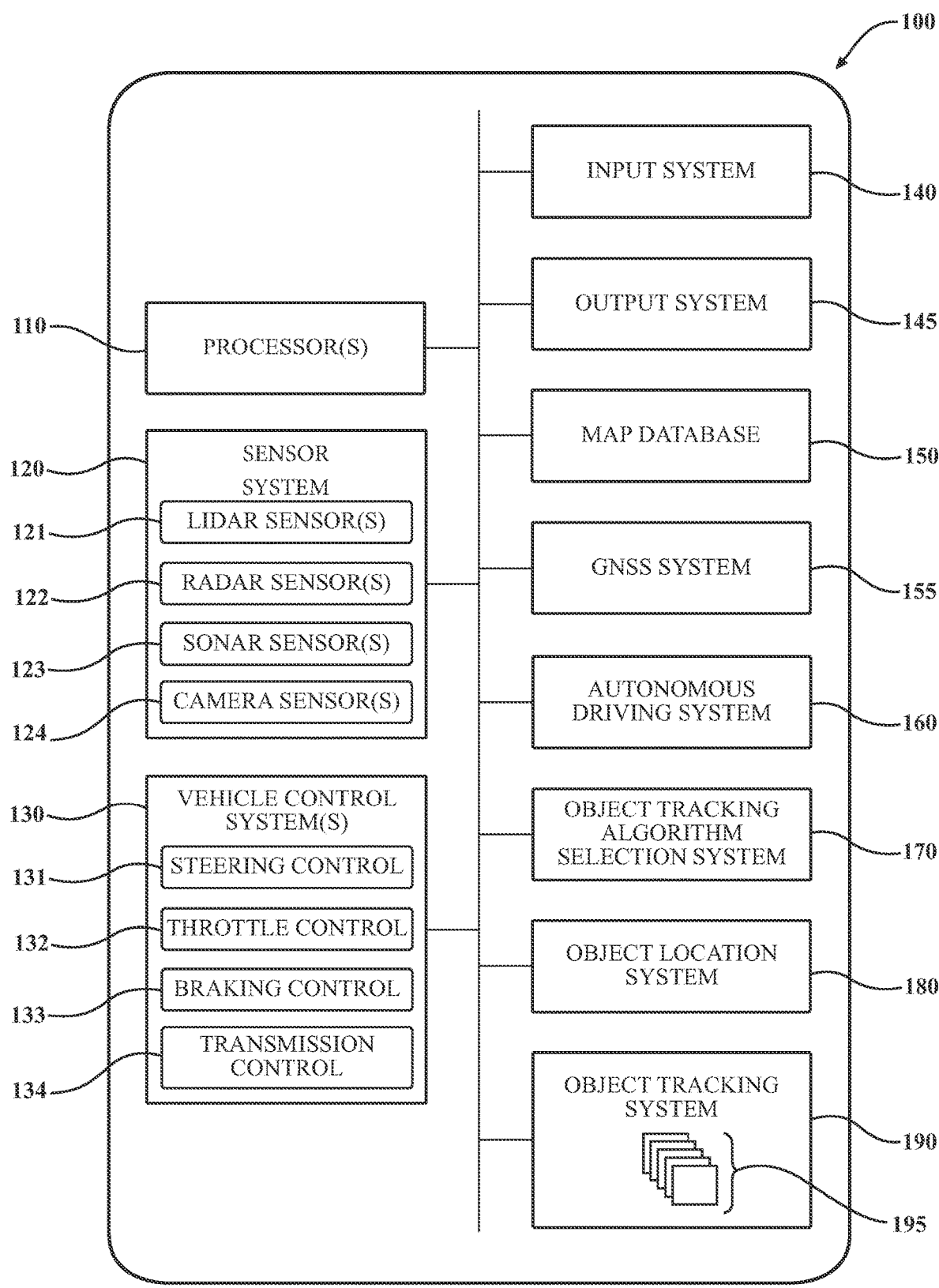
FIG. 1 illustrates an example of a vehicle that includes an object tracking algorithm selection system.

FIG. 1 illustrates an example of a vehicle 100 that may incorporate the object tracking algorithm selection system 170. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems and thus benefits from the functionality discussed herein. However, the vehicle 100 could be semi-autonomous or non-autonomous.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion figures for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

The vehicle 100 can include the processor(s) 110. In one or more arrangements, the processor(s) 110 can be a main processor of the vehicle 100. For instance, the processor(s) 110 can be an electronic control unit (ECU). The vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently. Alternatively, two or more of the sensors can work in combination with each other. In such a case, the two or more sensors can form a sensor network. The sensor system 120 and/or the one or more sensors can be operatively connected to the processor(s) 110 and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. The sensor system 120 can include one or more environment sensors configured to acquire, and/or sense driving environment data. "Driving environment data" includes data or information about the external environment in which an autonomous vehicle is located or one or more portions thereof. For example, the one or more environment sensors can be configured to detect, quantify and/or sense obstacles in at least a portion of the external environment of the vehicle 100 and/or information/data about such obstacles. Such obstacles may be stationary objects and/or dynamic objects. The one or more environment sensors can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. However, it will be understood that the embodiments are not limited to the particular sensors described. As an example, in one or more arrangements, the sensor system 120 can include one or more LIDAR sensors 121, one or more radar sensors 122, one or more sonar sensors 123, and/or one or more camera sensors 124. In one or more arrangements, the one or more cameras sensors 124 can be high dynamic range (HDR) cameras or infrared (IR) cameras.

The vehicle 100 may also include a map database 150 and a global navigation satellite system (GNSS) 155. The GNSS 155 can receive one or more signals from satellites. These one or more signals can be interpreted by the GNSS 155 to determine the location of the vehicle 100. In one example, the GNSS 155 may be a Global Positioning System, but may be other types of GNSS systems such as Global Navigation Satellite System (GLONASS), BeiDou Navigation Satellite System (BDS), and Galileo.

The map database 150 may include one or more electronic maps of the environment. The map database 150 may include information regarding the location of roads, road markers (stop signs, traffic lights, traffic signs, and the like), and specific information about roads. For example, with regards to roads, the map database 150 may include information regarding if the road is a traditional road that allows non-motorized vehicles and pedestrians to utilize portions of the roads or a highway, such as a controlled-access highway, which may be prohibited for use by pedestrians and non-motorized vehicles. Other types of information may include the location of crosswalks that may cross one or more roads within the map database 150. The map database 150 may include information regarding the location and borders of different municipalities, such as cities and townships, and other information regarding the borders of different entities, such as parks, farms, playgrounds, schools, military bases, hospitals, and the like.

Figure 2:
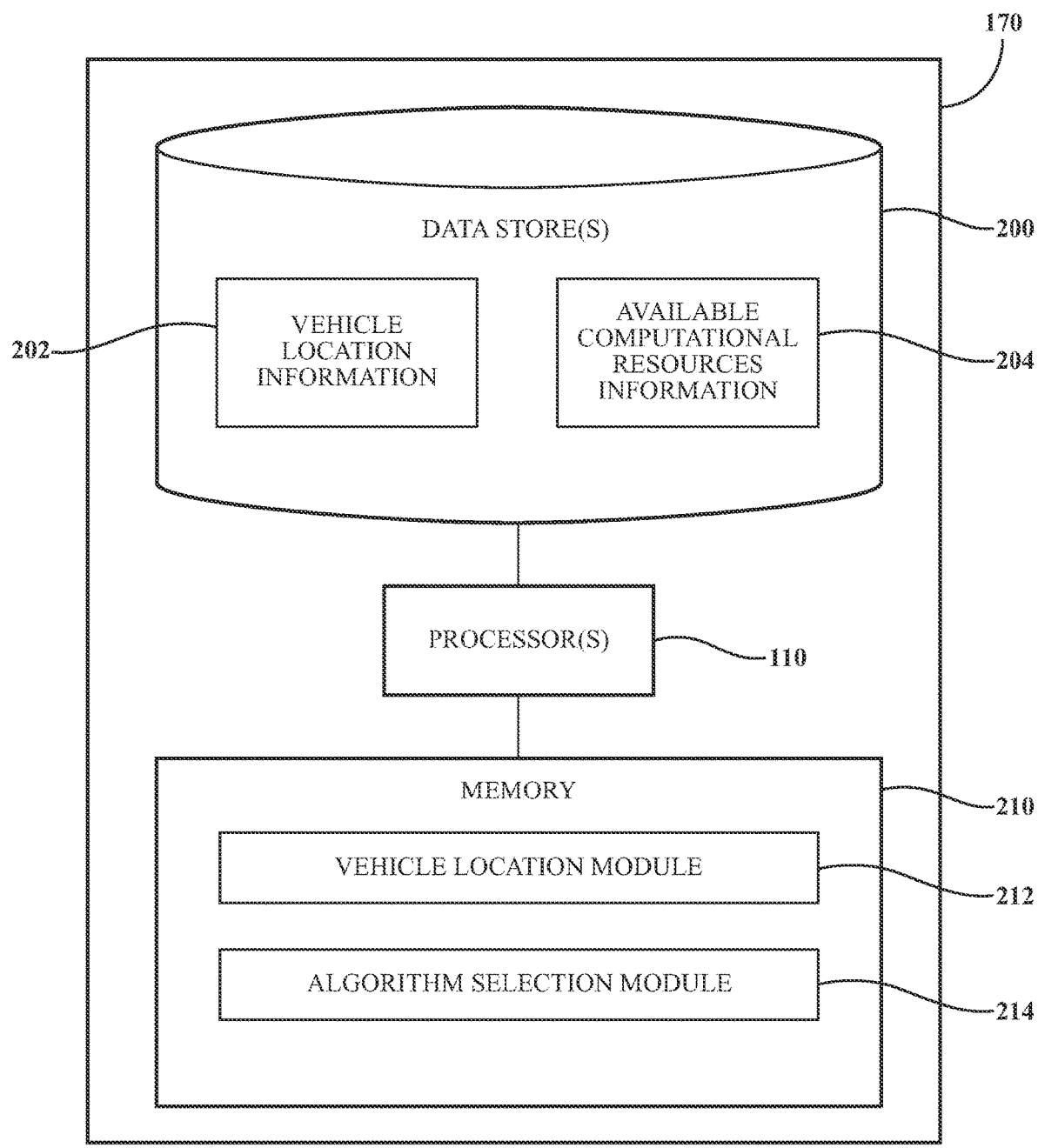
FIG. 2 illustrates a more detailed block diagram of the object tracking algorithm selection system of FIG. 1.

FIG. 2 illustrates a more detailed view of the object tracking algorithm selection system 170. As shown, the object tracking algorithm selection system 170 may include one or more processor(s) 110. Accordingly, the processor(s) 110 may be a part of the object tracking algorithm selection system 170, or the object tracking algorithm selection system 170 may access the processor(s) 110 through a data bus or another communication path. In one or more embodiments, the processor(s) 110 is an application-specific integrated circuit that is configured to implement functions associated with a vehicle location module 212 and an algorithm selection module 214.

In general, the processor(s) 110 is an electronic processor such as a microprocessor capable of performing various functions as described herein. In one embodiment, the object tracking algorithm selection system 170 includes a memory 210 that stores the vehicle location module 212 and the algorithm selection module 214. The memory 210 is a random-access memory (RAM), read-only memory (ROM), a hard disk drive, a flash memory, or other suitable memory for storing the vehicle location module 212 and the algorithm selection module 214. The vehicle location module 212 and the algorithm selection module 214 are, for example, computer-readable instructions that, when executed by the processor(s) 110, cause the processor(s) 110 to perform the various functions disclosed herein.

Furthermore, in one embodiment, the object tracking algorithm selection system 170 includes one or more data store(s) 200. The data store(s) 200 is, in one embodiment, an electronic data structure such as a database that is stored in the memory 210 or another memory and that is configured with routines that can be executed by the processor(s) 110 for analyzing stored data, providing stored data, organizing stored data, generating data, and so on. Thus, in one embodiment, the data store(s) 200 stores data used or generated by the vehicle location module 212 and the algorithm selection module 214 in executing various functions.

In this example, the data store(s) 200 may include vehicle location information 202, including information regarding if the vehicle 100 is located in an urban or non-urban setting. As will be explained later in this specification, the terms "urban" and "non-urban" may relate to the type of road that the vehicle 100 is located on. In some cases, the vehicle may be located on a controlled-access highway, which prohibits pedestrians and/or non-motorized vehicles to utilize it. In these types of situations, the vehicle 100 would be deemed to be in a non-urban setting, even if the closed access highway is located in the downtown of a major city center. Conversely, if the vehicle is located on a road that can be utilized, at least in parts, by pedestrians and/or non-motorized vehicles, this type of setting may be deemed as urban, even if the setting is located in a very small town or otherwise rural setting.

The data store(s) 200 may also include available computational resources information 204. This information may include the amount of computational resources available for use by an object tracking system 190. Moreover, the object tracking system 190 may be able to utilize different types of object tracking algorithms 195 that may have different computational requirements. In some cases, one or more of the object tracking algorithms 195 may be deemed lower computationally intensive algorithms, while others may be deemed higher computationally intensive algorithms.

The vehicle location module 212 may include instructions that, when executed by the processor(s) 110, cause the processor(s) 110 to determine if the vehicle 100 is located in an urban setting or a non-urban setting. In one example, the vehicle location module 212 causes the processor(s) 110 to determine the location of the vehicle 100. The location of the vehicle 100 may be determined by receiving information from the GNSS 155, which, as explained earlier, can receive one or more satellite signals and determine the general location of the vehicle 100 based on these signals.

Based on the location of the vehicle 100 determined by the GNSS 155, the vehicle location module 212 may cause the processor(s) 110 to determine the type of road that the vehicle 100 is traveling on by cross-referencing the location of the vehicle 100 with information from the map database 150. Based on the road type, the vehicle location module 212 may cause the processor to determine the type of setting that the vehicle 100 is operating within. Moreover, if the processor(s) 110 determines that the vehicle is operating on a highway and/or controlled-access highway or other type of road that generally prohibits use by non-motorized vehicles and/or pedestrians, the processor(s) 110 may determine that the vehicle 100 is operating in a non-urban setting. It should be understood that even if the vehicle 100 is located on a closed access highway in a major urban center, it still may be considered as a non-urban setting.

Conversely, if the processor(s) 110 determines that the vehicle is operating on a road that allows at least a portion of the road to be utilized by pedestrians and/or non-motorized vehicles, the processor(s) 110 may determine that the vehicle 100 is operating in an urban setting. As such, this may be true even if the vehicle 100 is located on a road in a very small town.

Figure 3:
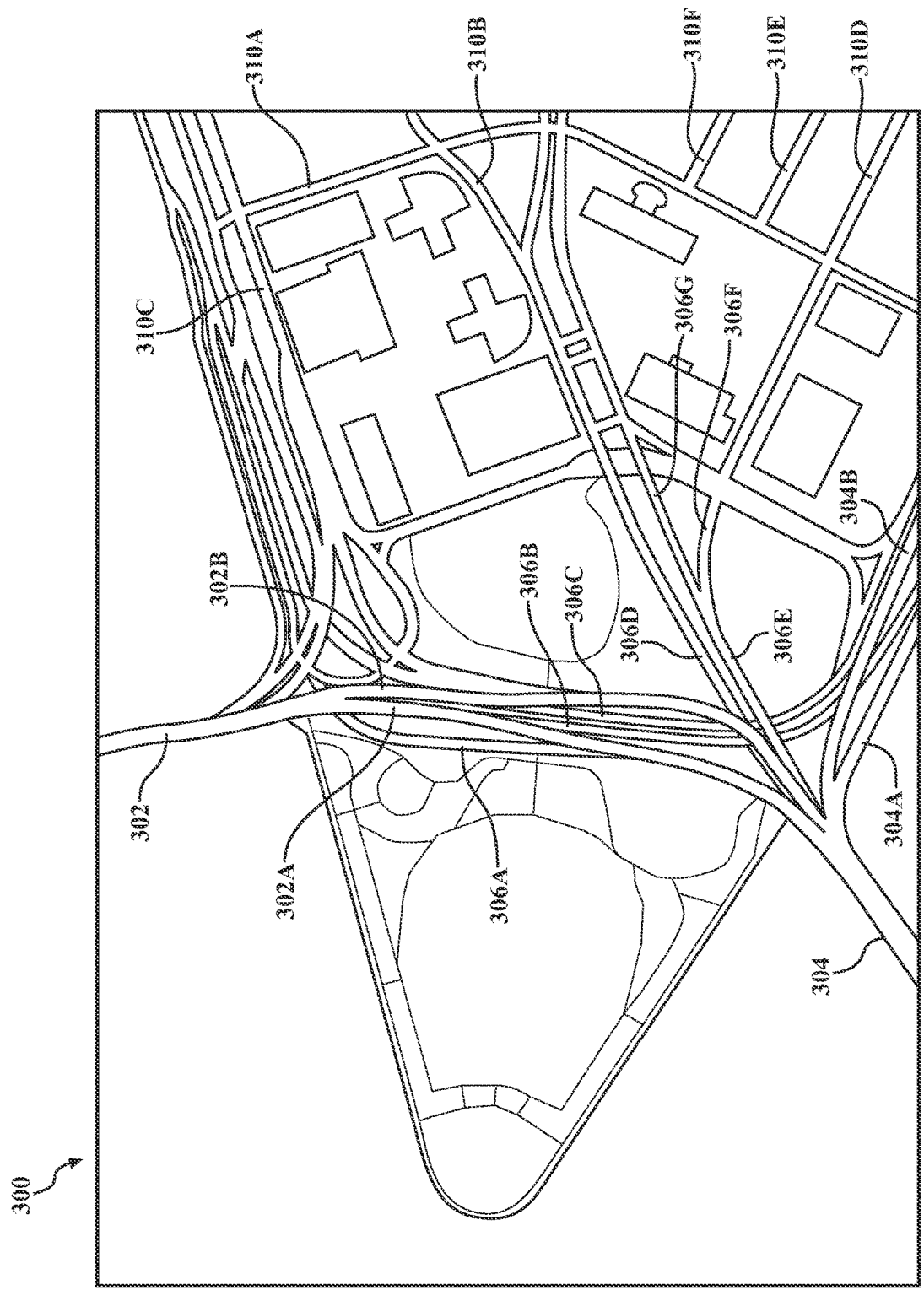
FIG. 3 illustrates a scene of a major downtown region that includes both urban and non-urban settings.

For example, referring to FIG. 3, a map 300, which may be similar to a map stored in the map database 150 is shown of a portion of downtown Pittsburgh, Pa. The map 300 illustrates numerous roads, including both closed access highways and roads that may be utilized by pedestrians and/or non-motorized vehicles. For example, with regards to closed access roads, these include roads 302 and 304 as well as their arterial roads 302A-302B, 304A-304B, and 306A-306G. If the vehicle 100 is operating on the roads 302 and 304 as well as their arterial roads 302A-302B, 304A-304B, and 306A-306G, the vehicle 100 may be determined by the processor(s) 110 to be located within a non-urban setting even though the vehicle 100 is located within a major downtown area.

However, if the processor(s) 110 determines that the vehicle 100 is located on a traditional city street, such as roads 310A-310F, the processor(s) 110 may determine that the vehicle 100 is operating in an urban setting. Generally, determining what type of street is deemed an urban setting or a non-urban setting is based on whether pedestrians or non-motorized vehicles may utilize portions of these roads. In this example, pedestrians and non-motorized vehicles can access and utilize portions of the roads 310A-310F, but generally cannot access due to legal prohibitions the roads 302 and 304 as well as their arterial roads 302A-302B, 304A-304B, and 306A-306G.

However, it should be understood that the vehicle location module 212 may cause the processor(s) 110 to utilize other ways in determining if the vehicle 100 is operating within an urban setting or a non-urban setting. For example, instead of, or in addition to, utilizing the location of the vehicle 100 and a map database 150, the vehicle location module 212 may cause the processor(s) 110 to utilize information from the sensor system 120. Moreover, the sensor system 120 can collect information regarding the environment, including the presence of other vehicles, pedestrians, non-motorized vehicles, and the like. Moreover, the object location system 180 of the vehicle 100 may receive information from the sensor system 120 to determine the location and the type of object.

As such, instead of, or in addition to, utilizing the location of the vehicle 100 and road information from a map database 150, the processor(s) 110 may determine the presence of pedestrians and/or non-motorized vehicles within a setting. If pedestrians and/or non-motorized vehicles are detected, the processor(s) 110 may determine that the vehicle is located within an urban setting. In addition to looking at moving objects, such as pedestrians and non-motorized vehicles, the sensor system 120 may detect roadside features, such as crosswalks, stop signs, stop lights, and the like that are generally utilized on roads that allow pedestrians and/or non-motorized vehicles to access them. As such, if the processor(s) 110 determines the presence of these roadside features, the processor(s) 110 may determine that the vehicle 100 is operating in an urban setting.

Additionally, upon detection of one of these features or the detection of pedestrians and/or non-motorized vehicles, the vehicle location module 212 may cause the processor(s) 110 to keep the determination that the vehicle 100 is operating in an urban setting until a certain amount of time has passed after one of these features, pedestrians, or non-motorized vehicles have been detected. For example, upon detection of one of these features, pedestrians, or non-motorized vehicles, the system may set a timer for a period of time such as five minutes, 10 minutes, one hour, etc., wherein the processor(s) 110 maintains that the vehicle is located within an urban setting until the timer has expired. If these features, pedestrians, or non-motorized vehicles are detected again when the timer is still active, the timer may reset to whatever time period was previously utilized.

Instead of, or in addition to, utilizing a timer to determine when it may be acceptable to change the setting from an urban setting to a non-urban setting, the distance that the vehicle 100 has traveled may also be considered. For example, if the processor(s) 110 using information from the sensor system 120 determines that a pedestrian is present, the processor(s) 110 may determine that the vehicle 100 is operating in an urban setting. If the vehicle 100 travels a set distance and no other pedestrians, motorized vehicles, or other features described above are detected during that set distance, the processor(s) 110 may determine that the vehicle 100 is now operating in a non-urban setting.

Figure 4:
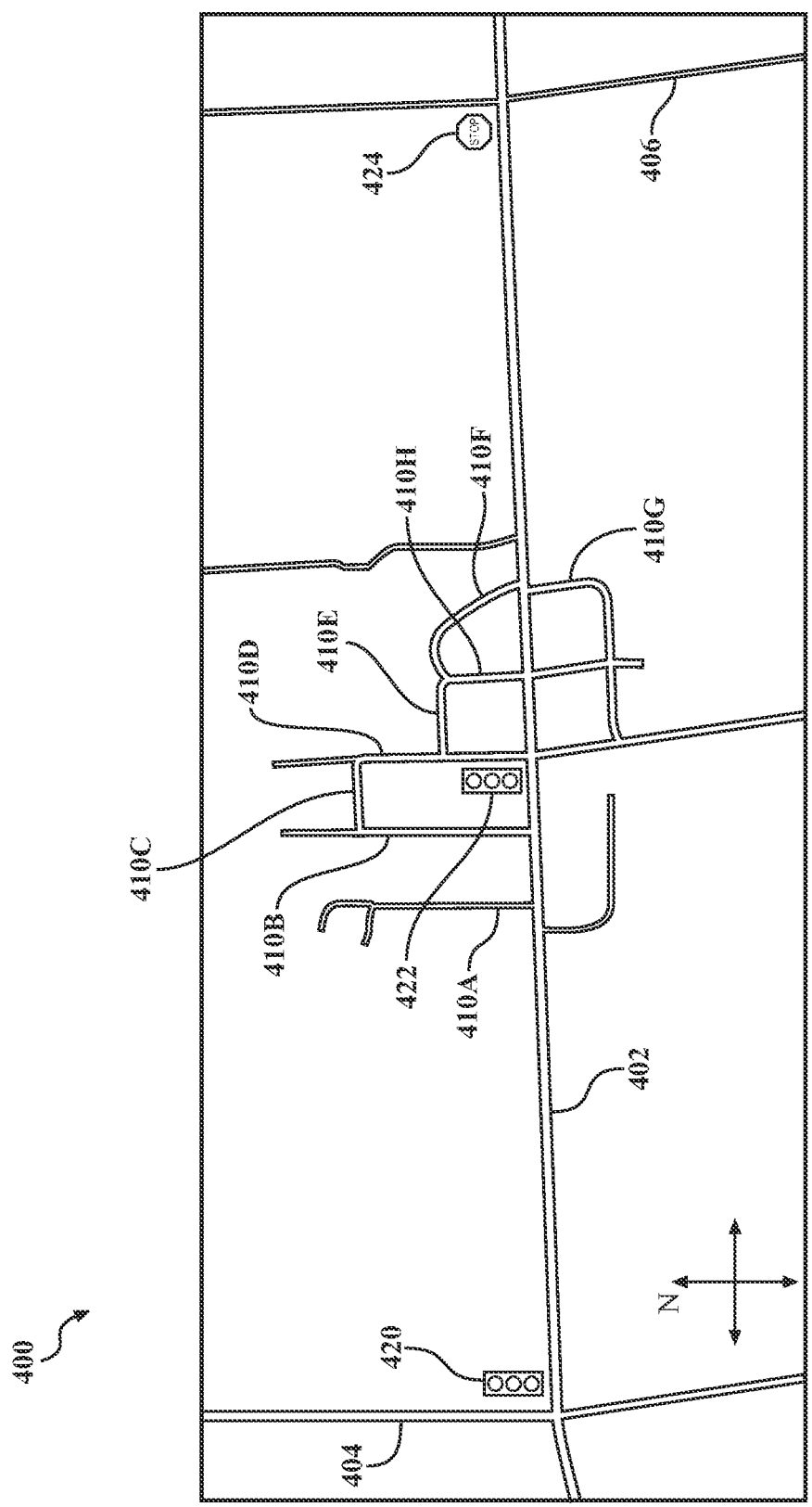
FIG. 4 illustrates a scene of a small-town region that includes both urban and non-urban settings.

For example, referring to FIG. 4, illustrated is a map of a small town. The map includes two-lane highways 402, 404, and 406. In this example, the two-lane highways 402, 404, and 406 may allow pedestrians and non-motorized vehicles to utilize them. In addition, the map 400 also illustrates side roads 410A-410G. Stoplights 420 and 422 are located at the intersections of the roads 402 and 404 and the roads 402 and 410D, respectively. A stop sign 424 is located at the intersection of the roads 402 and 406.

In this example, assume that the vehicle 100 is traveling westbound along the road 402 and approaches the stop sign 424. In this example, the vehicle location module 212 may cause the processor(s) 110 to receive information from the sensor system 120 that can indicate the presence of the stop sign 424. Upon detecting the stop sign 424, the vehicle location module 212 may cause the processor(s) 110 to determine that the vehicle 100 is operating in an urban setting. The determination of the vehicle 100 is operating in an urban setting may be continuous for a period of time and/or based on a set distance that the vehicle 100 travels.

As the vehicle 100 travels past the stop sign 424 and continues westbound, if a certain amount of time or distance elapses before a pedestrian, non-motorized vehicle, or feature (stop sign, crosswalk, stoplight) is detected, the vehicle location module 212 may cause the processor(s) 110 to determine that the vehicle 100 is now operating in a non-urban setting. However, as the vehicle approaches the roads 410A-410E and/or the stoplight 422, the vehicle location module 212 may cause the processor(s) 110 to determine that the vehicle 100 is now operating in an urban setting.

As the vehicle 100 continues westbound along the road 402 and travels past the stoplight 422 and the road 410A, the vehicle location module 212 may cause the processor(s) 110 to determine that the vehicle is now operating in a non-urban setting and will continue to do so until the vehicle reaches the stoplight 420. As such, the vehicle location module 212 may cause the processor(s) 110 to determine if the vehicle 100 is operating in an urban setting or non-urban setting utilizing the location of the vehicle 100 and map information and/or using information collected from the sensor system 120.

If it is determined by the processor(s) 110 that the vehicle 100 is operating in a non-urban setting, the algorithm selection module 214 causes the processor(s) 110 to utilize a lower computationally demanding object tracking algorithm from the object tracking algorithms 195 195 by the object tracking system 190. Moreover, since fewer objects and/or objects that are more fragile, such as pedestrians and non-motorized vehicles are less likely to be present in a non-urban setting, the object tracking system 190 can use a less computationally complex object tracking algorithm as there is less danger of colliding with another object, especially a fragile object.

Regarding the object tracking algorithms 195 195, the object tracking algorithms 195 195 can include any one of a number of different object tracking algorithms that vary in computational complexity. For example, the algorithms can include any of the following: a Kalman filtering object tracking algorithm, a particle filtering object tracking algorithm, an interacting multiple models algorithm, a joint integrated probabilistic data association algorithm, and/or a multiple hypothesis tracking algorithm. It is noted that the algorithms listed in the previous sentence are listed in order from less computationally complex to more computationally complex. It should be understood that the more computationally complex algorithm is, the more resources it demands. These resources may include processor related resources, storage resources, and/or memory resources.

As such, if it is determined that the vehicle 100 is operating in a non-urban setting, a less complex algorithm, such as the Kalman filtering object tracking algorithm or the particle filtering object tracking algorithm may be utilized by the object tracking system 190. Conversely, if the vehicle 100 is operating in an urban setting, a more computationally complex algorithm, such as the interacting multiple models algorithm, the joint integrated probabilistic data association algorithm, or the multiple hypothesis tracking algorithm may be selected.

In one example, if it is determined by the processor(s) 110 that the vehicle 100 is operating in an urban setting, the algorithm selection module 214 may cause the processor(s) 110 to determine the available computational resources for the object tracking system 190. The computational resources may include available storage, available memory, and the ability of the processor(s) 110 to perform object tracking in real-time or near real-time, or such that the performance of the object tracking system 190 operates is expected. Based on this determination, the algorithm selection module 214 may cause the processor(s) 110 to select the most computationally complex algorithm for the object tracking system 190 that can be satisfied by the available computational resources previously determined.

In addition to determining the available computational resources, the algorithm selection module 214 may cause the processor(s) 110 to determine the number of objects detected by the sensor system 120 to determine how many objects the object tracking system 190 may need to track. Generally, as more objects need to be tracked, the greater the computational resources. Knowing the number of objects that need to be tracked can impact how many computational resources will be required to perform object tracking by the object tracking system 190.

As such, once the available computational resources are determined, the algorithm selection module 214 may cause the processor(s) 110 to select a higher computationally demanding object tracking algorithm by the object tracking system 190 when the available computational resources are sufficient to execute the higher computationally demanding object tracking algorithm and the vehicle 100 is located in an urban setting.

Figure 5:
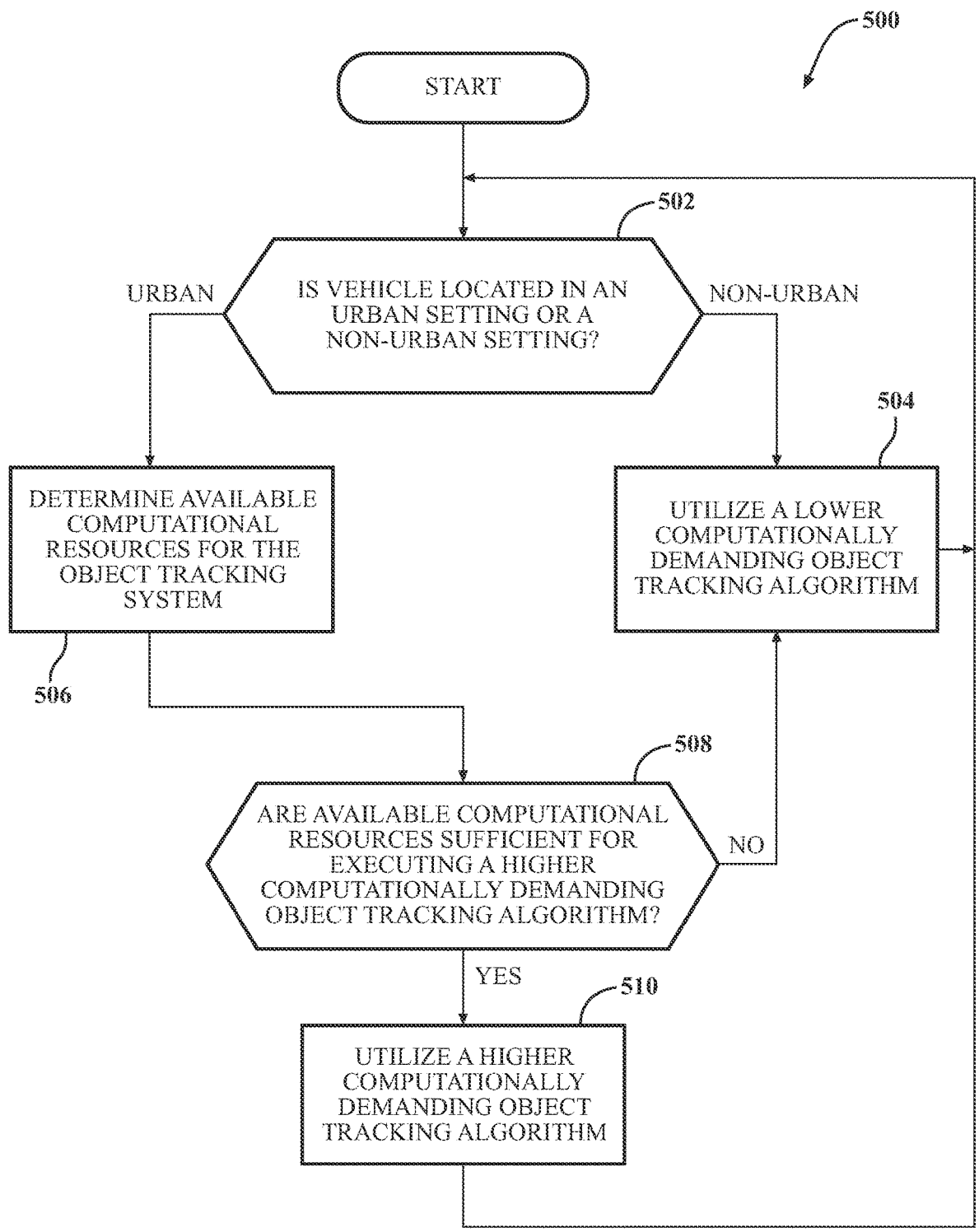
FIG. 5 illustrates a method of performing the selection of an object tracking algorithm.

Referring to FIG. 5, a method 500 for utilizing one of a plurality of different tracking over the moons for tracking objects is shown. The method 500 will be described from the viewpoint of the vehicle 100 of FIG. 1 and the object tracking algorithm selection system 170 of FIG. 2. However, it should be understood that this is just one example of implementing the method 500. While the method 500 is discussed in combination with the object tracking algorithm selection system 170, it should be appreciated that the method 500 is not limited to being implemented within the object tracking algorithm selection system 170 but is instead one example of a system that may implement the method 500.

In step 502, the vehicle location module 212 caused the processor(s) 110 to determine if the vehicle 100 is located in an urban setting or a non-urban setting. In one example, the vehicle location module 212 causes the processor(s) 110 to determine the location of the vehicle 100. The location of the vehicle 100 may be determined by receiving information from the GNSS 155, which, as explained earlier, can receive one or more satellite signals and determine the general location of the vehicle 100 based on these signals.

Based on the location of the vehicle 100 determined by the GNSS 155, the vehicle location module 212 may cause the processor(s) 110 to determine the type of road that the vehicle 100 is traveling on by cross-referencing the location of the vehicle 100 with information from the map database 150. Based on the road type, the vehicle location module 212 may cause the processor to determine the type of setting that the vehicle 100 is operating within. Moreover, if the processor(s) 110 determines that the vehicle is operating on a highway and/or controlled-access highway or other type of road that generally prohibits use by non-motorized vehicles and/or pedestrians, the processor(s) 110 may determine that the vehicle 100 is operating in a non-urban setting. It should be understood that even if the vehicle 100 is located on a closed access highway in a major urban center, it still may be considered as a non-urban setting.

Alternatively, or in addition to, the vehicle location module 212 may cause the processor(s) 110 to utilize information from the sensor system 120. Moreover, the sensor system 120 can collect information regarding the environment, including the presence of other vehicles, pedestrians, non-motorized vehicles, and the like. Moreover, the object location system 180 of the vehicle 100 may receive information from the sensor system 120 to determine the location and the type of object.

As such, instead of, or in addition to, utilizing the location of the vehicle 100 and road information from a map database 150, the processor(s) 110 may determine the presence of pedestrians and/or non-motorized vehicles within a setting. If pedestrians and/or non-motorized vehicles are detected, the processor(s) 110 may determine that the vehicle is located within an urban setting. In addition to looking at moving objects, such as pedestrians and non-motorized vehicles, the sensor system 120 may detect roadside features, such as crosswalks, stop signs, stop lights, and the like that are generally utilized on roads that allow pedestrians and/or non-motorized vehicles to access them. As such, if the processor(s) 110 determines the presence of these roadside features, the processor(s) 110 may determine that the vehicle 100 is operating in an urban setting.

If it is determined that the vehicle 100 is operating in a non-urban setting, the method 500 may proceed to step 504. In step 504, the algorithm selection module 214 causes the processor(s) 110 to utilize a lower computationally demanding object tracking algorithm from the object tracking algorithms 195 195 by the object tracking system 190.

However, if it is determined that the vehicle 100 is operating in an urban setting, the method 500 may proceed to step 506. In step 506, the algorithm selection module 214 may cause the processor(s) 110 to determine the available computational resources for the object tracking system 190. The computational resources may include available storage, available memory, and the ability of the processor(s) 110 to perform object tracking in real-time or near real-time, or such that the performance of the object tracking system 190 operates is expected.

In step 508, the algorithm selection module 214 may cause the processor(s) 110 to determine if the available computational resources are sufficient for executing a higher computationally demanding object tracking algorithm. Based on this determination, the algorithm selection module 214 may cause the processor(s) 110 to select the most computationally complex algorithm for the object tracking system 190 that can be satisfied by the available computational resources previously determined. As such, in step 510, the algorithm selection module 214 may cause the processor (s) 110 to utilize computational demanding object tracking over them. Alternatively, in step 504, the algorithm selection module 214 may cause the processor(s) 110 to utilize a lower computationally demanding object tracking algorithm.

FIG. 1 will now be discussed in full detail as an example environment within which the system and methods disclosed herein may operate. In one or more embodiments, the vehicle 100 is an autonomous vehicle, but could also be a non-autonomous or semi-autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 includes one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

As stated before, the vehicle 100 can include the processor(s) 110. In one or more arrangements, the processor(s) 110 can be a main processor of the vehicle 100. For instance, the processor(s) 110 can be an electronic control unit (ECU). The vehicle 100 can include the sensor system 120. The sensor system 120 can include one or more sensors.

The vehicle 100 can include an input system 140. An "input system" includes any device, component, system, element, or arrangement, or groups that enable information/data to be entered into a machine. The input system 140 can receive an input from a vehicle passenger (e.g., a driver or a passenger). The vehicle 100 can include an output system 145. An "output system" includes any device, component, or arrangement, or groups thereof that enable information/data to be presented to a vehicle passenger (e.g., a person, a vehicle passenger, etc.).

The vehicle 100 can include one or more vehicle control system(s) 130. Various examples of the vehicle control system(s) 130 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a steering control 131 for controlling the steering of the vehicle 100, a throttle control 132 for controlling the throttle of the vehicle 100, a braking control 133 for controlling the braking of the vehicle 100, and/or a transmission control 134 for controlling the transmission and/or other powertrain components of the vehicle 100. These systems can include one or more devices, components, and/or a combination thereof, now known or later developed.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine the position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof (e.g., one or more of vehicle control system(s) 130.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and can carry out these methods when loaded in a processing system.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for utilizing a plurality of object tracking algorithms for tracking objects external to a vehicle, the plurality of object tracking algorithms include at least a lower computationally demanding object tracking algorithm and a higher computationally demanding object tracking algorithm, the system comprising:
 a processor;
 a memory in communication with the processor, the memory comprising a vehicle location module and an algorithm selection module;
 wherein the vehicle location module comprises instructions that, when executed by the processor, cause the processor to determine when the vehicle is located in an urban setting or a non-urban setting, the urban setting is when the vehicle is located on a controlled access highway and the non-urban setting is when the vehicle is located on a road with one or more areas designated for a movement of at least one of: non-motorized vehicles and pedestrians;
 in response to a determination that the vehicle is located in the non-urban setting, the algorithm selection module comprises instructions that, when executed by the processor, cause the processor to utilize the lower computationally demanding object tracking algorithm by an object tracking system when the vehicle is located in the non-urban setting; and in response to a determination that the vehicle is located in the urban setting, the algorithm selection module comprises instructions that, when executed by the processor, cause the processor to:
(a) determine available computational resources of the object tracking system,
(b) in response to a determination that the available computational resources are not sufficient to execute the higher computationally demanding object tracking algorithm, utilize the lower computationally demanding object tracking algorithm by the object tracking system, and
(c) in response to a determination that the available computational resources are sufficient to execute the higher computationally demanding object tracking algorithm, utilize the higher computationally demanding object tracking algorithm by the object tracking system.

2. The system of claim 1, wherein the vehicle location module further comprises instructions that, when executed by the processor, cause the processor to:
determine a present location of the vehicle; and
compare the present location of the vehicle to an electronic map to determine if the vehicle is located in the urban setting or the non-urban setting.

3. The system of claim 1, wherein the vehicle location module further comprises instructions that, when executed by the processor, cause the processor to:
receive information from one or more sensors of the vehicle regarding an environment the vehicle is operating within; and
determine if the vehicle is located in the urban setting or the non-urban setting based on information from the one or more sensors.

4. The system of claim 1, wherein the algorithm selection module further comprises instructions that, when executed by the processor, cause the processor to:
determine a number of objects detected by one or more sensors of the vehicle; and
determine available computational resources of the object tracking system based on the number of objects detected by the one or more sensors of the vehicle.

5. The system of claim 1, wherein the plurality of object tracking algorithms include at least two of:
a Kalman filtering object tracking algorithm;
a particle filtering object tracking algorithm;
an interacting multiple models algorithm;
joint integrated probabilistic data association algorithm; and
a multiple hypothesis tracking algorithm.

6. A method for utilizing a plurality of object tracking algorithms for tracking objects external to a vehicle, the plurality of object tracking algorithms include at least a lower computationally demanding object tracking algorithm and a higher computationally demanding object tracking algorithm, the method comprising the steps of:
determining when the vehicle is located in an urban setting or a non-urban setting, the urban setting is when the vehicle is located on a controlled access highway and the non-urban setting is when the vehicle is located on a road with one or more areas designated for a movement of at least one of: non-motorized vehicles and pedestrians;
in response to a determination that the vehicle is located in the non-urban setting, utilizing the lower computationally demanding object tracking algorithm by an object tracking system; and
in response to a determination that the vehicle is located in the non-urban setting:
(a) determining when available computational resources of the object tracking system are sufficient to execute the higher computationally demanding object tracking algorithm,
(b) in response to a determination that the available computational resources are not sufficient to execute the higher computationally demanding object tracking algorithm, utilizing the lower computationally demanding object tracking algorithm by the object tracking system, and
(c) in response to a determination that the available computational resources are not sufficient to execute the higher computationally demanding object tracking algorithm, utilizing the higher computationally demanding object tracking algorithm by the object tracking system.

7. The method of claim 6, further comprising the steps of:
determining a present location of the vehicle; and
comparing the present location of the vehicle to an electronic map to determine if the vehicle is located in the urban setting or the non-urban setting.

8. The method of claim 6, further comprising the steps of:
receiving information from one or more sensors of the vehicle regarding an environment the vehicle is operating within; and
determining if the vehicle is located in the urban setting or the non-urban setting based on information from one or more sensors.

9. The method of claim 6, further comprising the steps of:
determining a number of objects detected by one or more sensors of the vehicle; and
determining available computational resources of the object tracking system based on the number of objects detected by the one or more sensors of the vehicle.

10. The method of claim 6, wherein the plurality of object tracking algorithms include at least two of:
a Kalman filtering object tracking algorithm;
a particle filtering object tracking algorithm;
an interacting multiple models algorithm;
joint integrated probabilistic data association algorithm; and
a multiple hypothesis tracking algorithm.

11. A non-transitory computer-readable medium storing instructions for utilizing a plurality of object tracking algorithms for tracking objects external to a vehicle, the plurality of object tracking algorithms include at least a lower computationally demanding object tracking algorithm and a higher computationally demanding object tracking algorithm, the instructions, when executed by a processor, cause the processor to:
determine when the vehicle is located in an urban setting or a non-urban setting, the urban setting is when the vehicle is located on a controlled access highway and the non-urban setting is when the vehicle is located on a road with one or more areas designated for a movement of at least one of: non-motorized vehicles and pedestrians;
in response to a determination that the vehicle is located in the non-urban setting, utilize the lower computationally demanding object tracking algorithm by an object tracking system; and
in response to a determination that the vehicle is located in the non-urban setting:
(a) determine available computational resources of the object tracking system;

(b) in response to a determination that the available computational resources are not sufficient to execute the higher computationally demanding object tracking algorithm, utilize the lower computationally demanding object tracking algorithm by the object tracking system; and (c) in response to a determination that the available computational resources are sufficient to execute the higher computationally demanding object tracking algorithm, utilize the higher computationally demanding object tracking algorithm by the object tracking system.

12. The non-transitory computer-readable medium of claim 11, further comprising instructions that, when executed by the processor, cause the processor to:

determine a number of objects detected by one or more sensors of the vehicle; and determine available computational resources of the object tracking system based on the number of objects detected by the one or more sensors of the vehicle.

13. The non-transitory computer-readable medium of claim 11, wherein the plurality of object tracking algorithms include at least two of:

a Kalman filtering object tracking algorithm;
a particle filtering object tracking algorithm;
an interacting multiple models algorithm;
joint integrated probabilistic data association algorithm; and
a multiple hypothesis tracking algorithm.

\* \* \* \* \*